(12) United States Patent
Lin et al.

(10) Patent No.: US 10,642,263 B2
(45) Date of Patent: May 5, 2020

(54) UAV, CONTROL SYSTEM AND INTERMEDIARY DEVICE FOR UAV

(71) Applicant: National Taiwan University, Taipei (TW)

(72) Inventors: Ching-Fuh Lin, Taipei (TW); Ta-Jung Lin, Taipei (TW)

(73) Assignee: National Taiwan University, Taipei (TW)

( * ) Notice: Subject to any disclaimer, the term of this patent is extended or adjusted under 35 U.S.C. 154(b) by 127 days.

(21) Appl. No.: 15/847,881

(22) Filed: Dec. 19, 2017

(65) Prior Publication Data

US 2018/0210441 A1 Jul. 26, 2018

(30) Foreign Application Priority Data

Jan. 24, 2017 (TW) .............................. 106102688 A (51) Int. Cl.
| | |
|---|---|
| G05D 1/00 | (2006.01) |
| H04N 7/18 | (2006.01) |
| G05D 1/10 | (2006.01) |
| B64C 39/02 | (2006.01) |
| G03B 15/00 | (2006.01) |
| G05D 1/04 | (2006.01) |

(52) U.S. Cl.
CPC ......... *G05D 1/0016* (2013.01); *B64C 39/024* (2013.01); *G05D 1/0038* (2013.01); *G05D 1/042* (2013.01); *G05D 1/10* (2013.01); *H04N 7/185* (2013.01); *B64C 2201/024* (2013.01); *B64C 2201/108* (2013.01); *B64C 2201/127* (2013.01); *B64C 2201/146* (2013.01); *G03B 15/006* (2013.01); *H04N 7/18* (2013.01)

(58) Field of Classification Search
USPC .............................................. 701/2
See application file for complete search history.

(56) References Cited

U.S. PATENT DOCUMENTS

| | | | | |
|---|---|---|---|---|
| 2007/0284474 | A1* | 12/2007 | Olson | H04W 4/70 244/10 |
| 2015/0310298 | A1* | 10/2015 | Fern ndez Berni | G06K 9/00986 382/199 |
| 2016/0375984 | A1* | 12/2016 | Priest | B64C 27/06 701/3 |
| 2017/0248969 | A1* | 8/2017 | Ham | B64C 39/024 |
| 2018/0012662 | A1* | 1/2018 | Shin | G11C 16/0466 |
| 2018/0210441 | A1* | 7/2018 | Lin | H04N 7/185 |

* cited by examiner

*Primary Examiner* — Tyler D Paige
(74) *Attorney, Agent, or Firm* — Donald E. Stout; Stout, Uxa & Buyan, LLP (57) ABSTRACT

A control system for an unmanned aerial vehicle is disclosed. The control system includes a mobile device and an intermediary device. The mobile device is equipped with an APP allowing a user to input a control order. The intermediary device has a microprocessor for receiving the control order and generating an execution signal in accordance with the control order, and the execution signal is transmitted to the unmanned aerial vehicle. When the intermediary device does not receive any control order, the microprocessor automatically generates a hover signal for maintaining the unmanned aerial vehicle in a hovering flight state.

34 Claims, 6 Drawing Sheets

UAV, CONTROL SYSTEM AND INTERMEDIARY DEVICE FOR UAV

CROSS-REFERENCE TO RELATED APPLICATIONS

The entire contents of Taiwan Patent Application No. 106102688, filed on Jan. 24, 2017, from which this application claims priority, are expressly incorporated herein by reference.

BACKGROUND OF THE INVENTION

1. Field of the Invention

The present invention relates to an unmanned aerial vehicle and a control system and intermediary device used for the unmanned aerial vehicle.

2. Description of Related Art

An unmanned aerial vehicle (UAV), commonly known as a drone, is an aircraft without a human pilot aboard. It can be used for filming, product deliveries, surveillance, and other applications. Due to the popular applications, the development of unmanned aerial vehicle has drawn increasing attentions. Typically the unmanned aerial vehicle is controlled by a remote controller, which generally includes control sticks. An operator controls the speed and direction of the unmanned aerial vehicle via the control sticks. For easy operation, typically the remote controller has a large volume and hence is not convenient to carry.

In addition, some mobile application software(s) have been proposed to control the unmanned aerial vehicle via smartphones. The smartphones are daily used and have a small volume that is convenient to carry. However, using the touch panel of the smartphones has less sensitivity than the control sticks. Different smartphones may have different response speeds due to different touch panel designs and fabrication conditions and different finger conductivities among the operators. The touch sensitivity is difficult to be calibrated via the mobile application software. The signals are usually lagged to control the speed and direction, and hence the unmanned aerial vehicle cannot be precisely controlled. In addition, the operator must keep his or her' eyes on both the touch panel and the unmanned aerial vehicle, and because the speed of the unmanned aerial vehicle is fast, there is merely a very short time allowing the operator to look at the touch panel. Accordingly, using the touch panel of smartphones is not easy to learn and needs a long period of time to practice.

In addition, some other mobile application software(s) employ orientation sensor, accelerometer, and gyroscope of smartphones to replace the control stick for controlling the unmanned aerial vehicle by intuition. The control sensitivity is promoted by this method. However, the response is usually over reacted due to the high sensitivity of the orientation sensor, accelerometer, and gyroscope. The operator must concentrate his or her attention on the control; otherwise the unmanned aerial vehicle cannot fly well to perform missions such as aerial photographing. Accordingly, this type of control is not easy to learn either and also needs a long period of time to practice.

Further, another possible way of control is that the smartphones must be moved during the control via the orientation sensor, accelerometer, and gyroscope. Accordingly, the operator is not easy to clearly see the content displayed on the shaken touch panel. The operator must concentrate his or her attention on the control and is difficult to distract the attention for the mission such as aerial photographing. The unmanned aerial vehicle may be out of control by lacking of caution. Furthermore, the smartphones must be continuously adjusted to keep the unmanned aerial vehicle flying at a same elevation. The kind of operation is complex and difficult.

Accordingly, there is a need to provide a novel control system for solving the above-mentioned deficiencies, allowing the operation to be convenient and easy to handle.

SUMMARY OF THE INVENTION

An object of this invention is to provide a control system or component for an unmanned aerial vehicle with advantages easy to control and carry.

According to an embodiment of this invention, a control system used for an unmanned aerial vehicle is provided with a mobile device and an intermediary device. The mobile device is installed with an application software allowing an operator to input a control order. The intermediary device comprises a microprocessor for receiving the control order and encoding an executing signal according to the control order. The executing signal is transmitted to the unmanned aerial vehicle to control the unmanned aerial vehicle. The intermediary device automatically generates a hover signal to the unmanned aerial vehicle to render the unmanned aerial vehicle hovering in the air until a new control order is received.

According to an embodiment of this invention, an intermediary device used for a control system of an unmanned aerial vehicle is provided with at least a microprocessor and at least a control circuit. The microprocessor receives a control order from an operator and encoding an executing signal according to the control order, the executing signal being transmitted to the unmanned aerial vehicle to control the unmanned aerial vehicle. The control circuit provides a hover signal to make the unmanned aerial vehicle hovering in the air.

According to an embodiment of this invention, an unmanned aerial vehicle is provided for receiving an executing signal from an intermediary device and performing actions according to the executing signal, wherein the intermediary device receives a control order inputted by an operator from a mobile device and encoding the executing signal according to the control order, and the intermediary device automatically generates a hover signal to the unmanned aerial vehicle to make the unmanned aerial vehicle hovering in the air until a new control order is received.

DETAILED DESCRIPTION OF THE PREFERRED EMBODIMENT

Embodiments of the invention are now described and illustrated in the accompanying drawings, instances of which are to be interpreted to be to scale in some implementations while in other implementations, for each instance, not. In certain aspects, use of like or the same reference designators in the drawings and description refers to the same, similar or analogous components and/or elements, while according to other implementations the same use should not. According to certain implementations, use of directional terms, such as, top, bottom, left, right, up, down, over, above, below, beneath, rear, front, clockwise, and counterclockwise, are to be construed literally, while in other implementations the same use should not. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations and components are not described in detail in order not to unnecessarily obscure the present invention. While drawings are illustrated in detail, it is appreciated that the quantity of the disclosed components may be greater or less than that disclosed, except where expressly restricting the amount of the components.

Figure 1:
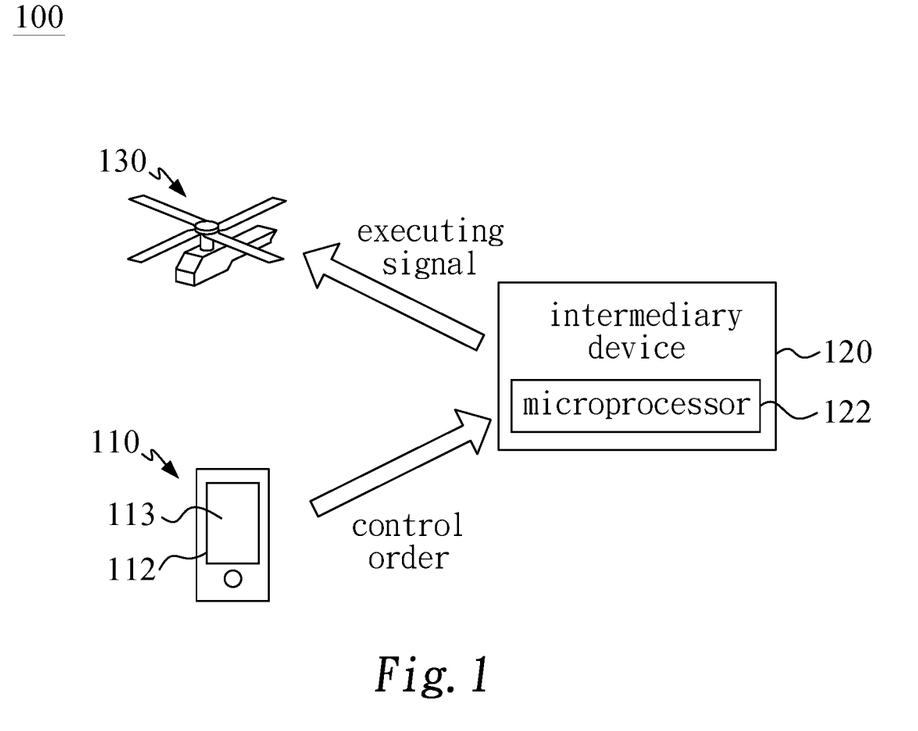
FIG. 1 illustrates a control system used for an unmanned aerial vehicle in accordance with a preferred embodiment of this invention.

FIG. 1 illustrates a control system used for an unmanned aerial vehicle in accordance with a preferred embodiment of this invention. Referring to FIG. 1, a control system 100 is used for an unmanned aerial vehicle 130 and includes a mobile device 110 to be handled by operator and an intermediary device 120. The mobile device 110 is equipped with an application software (app) for providing a control order to the intermediary device 120. The intermediary device 120 includes at least a microprocessor 122 for receiving the control order and encoding an executing signal according to the control order, and the executing signal is then transmitted to the unmanned aerial vehicle 130 to control the unmanned aerial vehicle 130. The intermediary device 120 automatically generates a hover signal to the unmanned aerial vehicle 130 if no any control order being received. The unmanned aerial vehicle 130 keeps stationary flight after receiving the hover signal.

In detail, after a control order is executed by the unmanned aerial vehicle 130, the microprocessor 122 of the intermediary device 120 will automatically generates a hover signal to the unmanned aerial vehicle 130 to keep the unmanned aerial vehicle 130 stationary in the air until a new control order is received from the mobile device 110. The hover signal will not be generated during the lifting off, landing, and power off of the unmanned aerial vehicle 130. The mobile device 110 can be a smartphone, a tablet (tablet computer), or a wearable device carried by the operator.

According to an embodiment of this invention, the application software 112 (app) may include an interface 113 allowing the operator to operate. The operator may tap the interface 113 once by his or her finger to input a control order, and then the unmanned aerial vehicle 130 is moved to a designated position according to the control order.

According to an embodiment of this invention, the mobile device 110 may include sensing elements such as orientation sensor, accelerometer, movement sensor, orientation sensor, and gyroscope to detect the motion of the operator's hand, so as to generate a control order accordingly. In an embodiment of this invention, a control order is generated only when the time difference between the two successive sensing signals due to the operator's motion detected by the sensing elements is at least 0.1 second. If the time difference that the sensing elements detect the operator's motion is less than 0.1 second, a control order will not be generated according to the detection of the operator's motion. This can avoid overreaction and misjudgments due to high sensitivity of the sensing elements. In an embodiment of this invention, the misjudgments can be avoided by limiting the time or the frequency of the operator's motion detection, and the time and the frequency of the operator's motion detection can be set via the application software 112 of the mobile device 110.

According to an embodiment of this invention, a motion is detected as a control order rather than a sequence of control orders. For example, regardless of movements to the right being 1 cm, 2 cm, or 3 cm, the detection of moving to the right is considered as the same control order.

According to an embodiment of this invention, a time threshold, a distance threshold, and an angle threshold may be predetermined, and control orders are generated accordingly. For example, a distance threshold and a time threshold are set as 3 cm and 0.1 second, respectively, and when the movement sensor detects a horizontal movement is less than 3 cm within 0.1 second, only a control order A will be generated. In another case, when the movement sensor detects a horizontal movement is greater than 3 cm within 0.1 second, a control order A and another control order B are generated.

According to an embodiment of this invention, the mobile device 110 includes a microphone (not shown) for receiving a voice of the operator, and a control order is generated according to the voice.

Figure 2A:
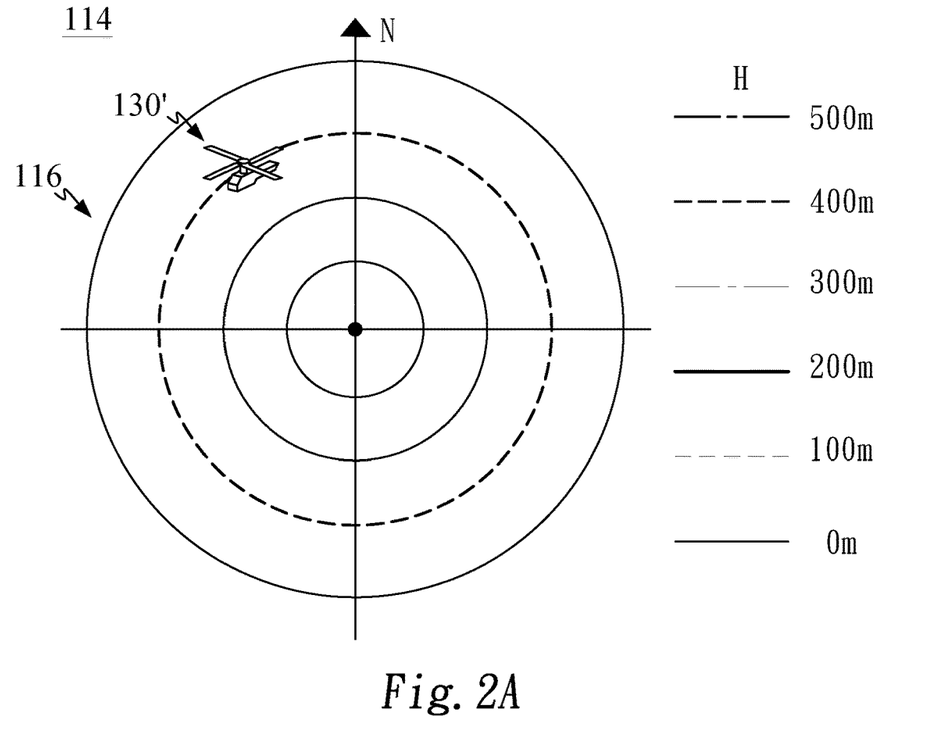
FIG. 2A is an image of the control system in accordance with an embodiment of this invention.

FIG. 2A illustrates a flight radar chart 114 displayed on the interface 113 of the application software 112 in accordance of an embodiment of this invention. Referring to FIG. 2A, the flight radar chart 114 includes concentric circles 116 to display the relative position of the unmanned aerial vehicle 130. The gap between concentric circles 116 denotes a real distance, such as 10 meters or 20 meters, and the real distance can be determined and adjusted by the operator.

Referring to FIG. 2A, the reference number 130' denotes the position of the unmanned aerial vehicle 130 and the center of the concentric circles 116 denotes a reference position determined by the operator. For example, this center may be the location of the operator. In another embodiment of this invention, the center of the concentric circles 116 denotes the position of the unmanned aerial vehicle 130. In both cases, the operator may touch or tap the flight radar chart 114 once by his or her finger, and a control order is generated for moving the unmanned aerial vehicle 130 to the position tapped by the operator.

Figure 2B:
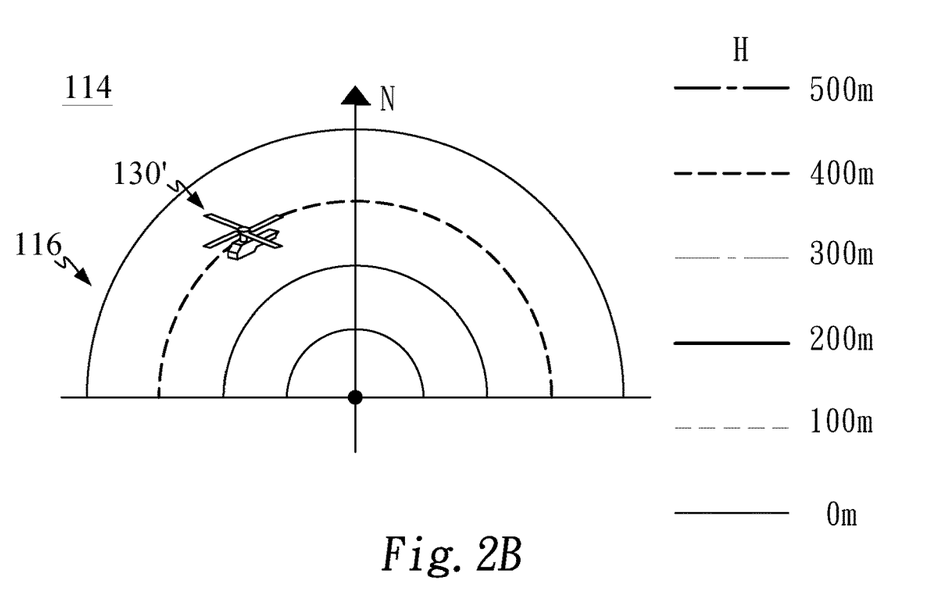
FIG. 2B is an image of the control system in accordance with an embodiment of this invention.

FIG. 2B illustrates a flight radar chart 114 displayed on the interface 113 of the application software 112 in accordance of another embodiment of this invention. Referring to FIG. 2B, the flight radar chart 114 includes concentric semi-circles 116 to display the position of the unmanned aerial vehicle 130. In this embodiment, the center of concentric semi-circles 116 is at the middle of the lower boundary of the interface 113. This design may be more convenient to operate.

Referring to FIGS. 2A and 2B, the flight radar chart 114 include concentric circles 116 or concentric semi-circles 116 as illustrated herein. However, the flight radar chart 114 may include concentric arcs or part-circles, such as concentric ¾-circles or concentric ⅖-circles according to another embodiment of this invention.

In an embodiment of this invention, concentric circles 116 or concentric part-circles 116 of the flight radar chart 114 may have different patterns, styles, or colors to indicate the altitude of the unmanned aerial vehicle 130. Referring to FIG. 2A, for example, the concentric circle, which the unmanned aerial vehicle 130 is located, is turned to dash lines and the right of the flight radar chart 114 can display an altitude list, and the corresponding dash line of the list indicates the unmanned aerial vehicle 130 is flying at an altitude of 400 m. In an embodiment of this invention, the altitude of the unmanned aerial vehicle 130 is indicated by a color. For example, different colors indicate different altitudes, and the different colors may have an order of red, orange, yellow, green, blue, indigo, and purple. The color indicating the altitude of the unmanned aerial vehicle 130' may be displayed in a concentric circle that the unmanned aerial vehicle 130' is located or displayed in the unmanned aerial vehicle 130' itself. The operator may change the altitude of the unmanned aerial vehicle 130' by changing the colors or the patterns, styles of the concentric circles 116 or concentric part-circles. And the mobile device 110 may have real or virtual buttons or icons allowing the operator to vary the colors or the patterns, styles of the concentric circles 116 or concentric part-circles.

In another embodiment of this invention, the operator may input a control order by touching or tapping the interface 113 two or more times or touching the interface 113 once for a longer period of time. The control order inputted by the above-mentioned actions may be used to perform a predetermined process. For example, the operator double taps the interface 113 may denote a control order to photograph by a camera of the unmanned aerial vehicle 130. In another embodiment of this invention, the interface 113 may include a virtual button, and a control order is generated by touching or tapping the virtual button for performing a predetermined function such as photographing or capturing an image. This design allows the operator to easily control the unmanned aerial vehicle 130.

In addition, a scene photographed by the camera may be displayed on the interface 113 in real time. The operator may touch or tap a position of the scene displayed on the interface 113, and the unmanned aerial vehicle 130 is ordered to fly to the position of the scene.

In an embodiment of this invention, both the flight radar chart 114 and the scenes photographed by the camera are simultaneously displayed on the interface 113 (e.g., screen) of the application software 112 of the mobile device 110. The operator can judge if the unmanned aerial vehicle 130 is at a proper position and attitude for photograph or video by the position of the unmanned aerial vehicle 130 and the scenes photographed by the camera. Or the other possibility is that a map is also shown simultaneously with the flight radar chart 114 and the scenes photographed by the camera. Whether the map is necessary depends on the distance of the unmanned aerial vehicle and the operator. If the unmanned aerial vehicle is far away, so the distance cannot be easily checked by the eyes, then a map will help to identify the location of the unmanned aerial vehicle and hence assist the judgment on the appropriateness of its location.

In an embodiment of this invention, the intermediary device 120 is a mobile device or a wearable device. Wire or wireless communication may be used between the intermediary device 120 and the mobile device 110. Bluetooth or Wi-Fi standard may be adopted for transferring information between the intermediary device 120 and the mobile device 110. Wireless communication, such as ZigBee, RF, ANT (pronounced ant plus), or IrDA (Infrared Data Association) standards, may be used for transferring information between the unmanned aerial vehicle 130 and the intermediary device 120. When the unmanned aerial vehicle 130 receives an executing signal from the intermediary device 120, the executing signal is translated to a control signal corresponding to a voltage or a current for a motor or a modulation signal, such as pulse-width modulation signal, for an electronic speed control (ESC). By using wireless communication(s) between the intermediary device 120 and the mobile device 110 and between the unmanned aerial vehicle 130 and the intermediary device 120, the range of wireless control can be extended. For example, the intermediary device 120 may amplify the executing signal so as to extend the distance of wireless control.

Figure 3A:
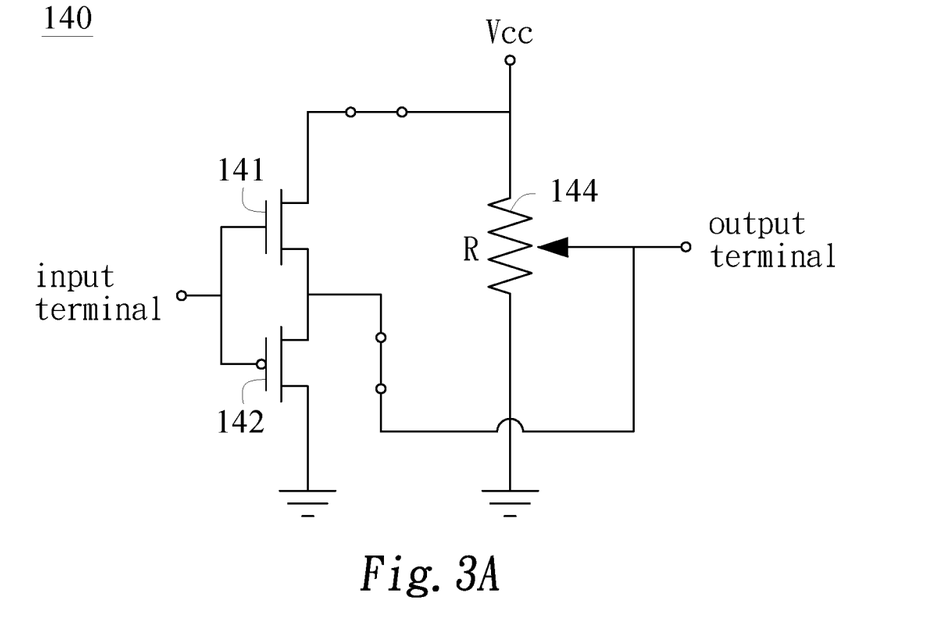
FIG. 3A is a circuit diagram showing a control circuit in accordance with an embodiment of this invention.

FIG. 3A is a circuit diagram showing a control circuit 140 of the unmanned aerial vehicle 130 in accordance with an embodiment of this invention. Referring to FIG. 3A, the intermediary device 120 includes the control circuit 140 to provide a signal for enabling the unmanned aerial vehicle 130 to hover in the air. The control circuit 140 includes an input terminal and an output terminal, where the input terminal is used to receive the executing signal encoded by the microprocessor 122. The control circuit also includes a P-type Metal-Oxide-Semiconductor Field-Effect Transistor (PMOS) 141, an N-type Metal-Oxide-Semiconductor Field-Effect Transistor (NMOS) 142, and a control resistor.

In detail, the gate of the PMOS 141 electrically connects with the input terminal, the source of the PMOS 141 electrically connects with a power source Vcc, the gate of the NMOS 142 electrically connects with input terminal, the drain of the NMOS 142 electrically connects with the drain of the Pmos 141 and the output terminal, and the source of the NMOS 142 is grounded. In this embodiment of this invention, the control resistor 144 is a variable resistor 144. The first terminal of the variable resistor 144 electrically connects with the power source VCC and the source of the PMOS 141, the second terminal of the variable resistor 144 is grounded, and the third terminal of the variable resistor 144 electrically connects with the output terminal. In another embodiment of this invention, the control resistor 144 comprises two resistors connected in series with one terminal electrically connected with the output terminal and another terminal electrically connected with the source of the PMOS 141 and electrically grounded.

Figure 3B:
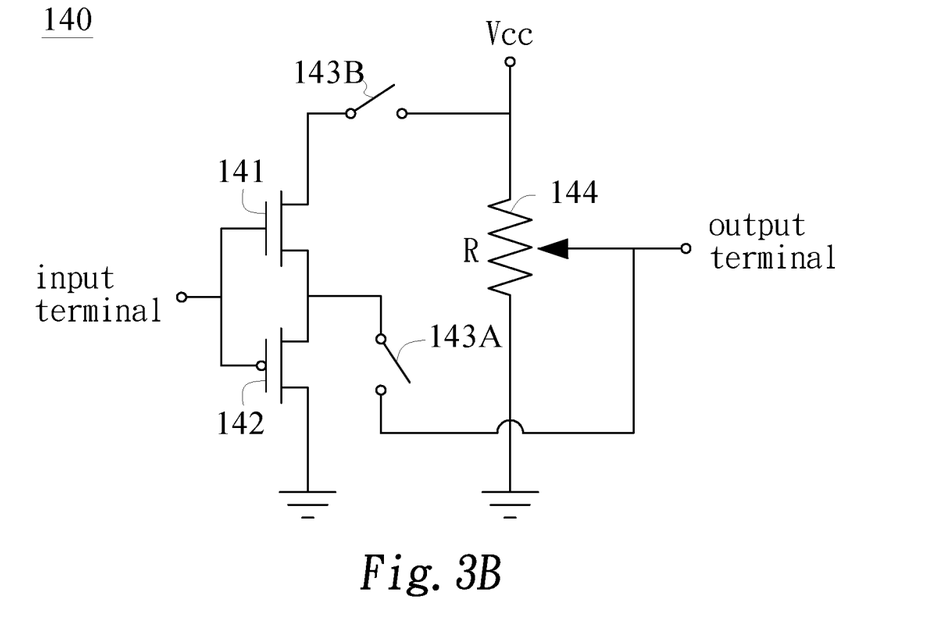
FIG. 3B is a circuit diagram showing a control circuit in accordance with an embodiment of this invention.
Figure 3C:
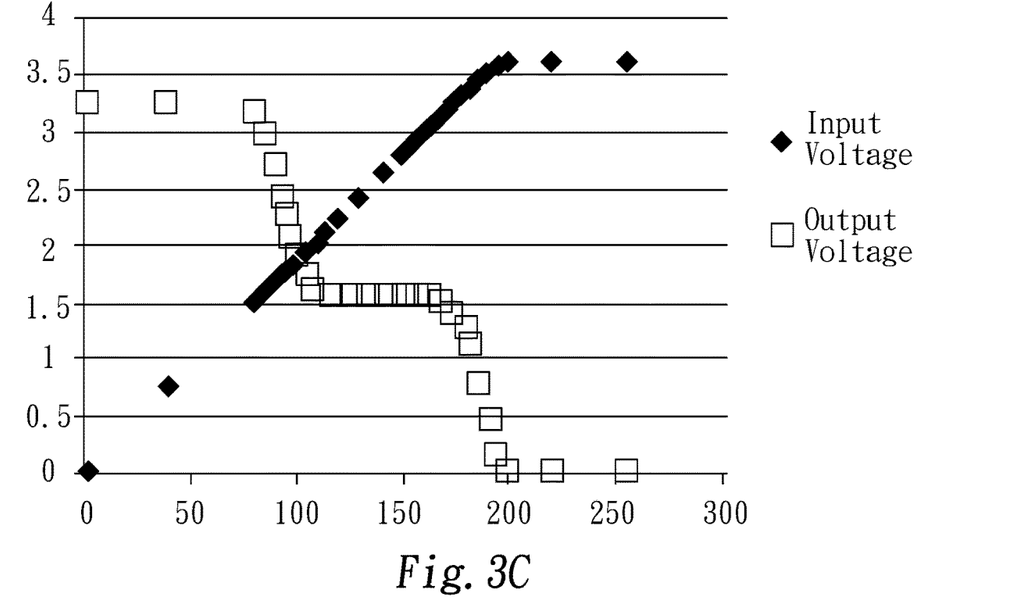
FIG. 3C is chart showing the relationship between input voltage and output voltage of the control circuit as shown in FIGS. 3A and 3B.

FIG. 3C is a chart showing the relationship between input voltage and output voltage of the control circuit as shown in FIG. 3A. As shown in FIG. 3C, the input voltage is a linear function, while the output voltage is a step function with a middle flat segment. The middle flat segment has an output voltage used for the hover of the unmanned aerial vehicle 130. The middle flat segment can keep the unmanned aerial vehicle 130 hovering in the air without fluctuating by interfering of noises or touches of incaution.

FIG. 3B is a circuit diagram showing a control circuit 140 of the unmanned aerial vehicle 130 in accordance with another embodiment of this invention. Referring to FIG. 3B, the control circuit 140 may include a first switch 143A to switch the control of the unmanned aerial vehicle 130 via the mobile device 110 or a stick interface (including one or more control sticks) of the intermediary device 120. In detail, the first switch 143A has two terminals with one electrically connected with the output terminal and the other electrically connected with the drain of the PMOS 141 and the drain of the NMOS 142. In addition, the control circuit 140 may include a second switch 143B, which has two terminals electrically connected with the source of the PMOS 141 and the power source Vcc, respectively.

Referring to FIG. 3B, when the first switch 143A is closed, the intermediary device 120 outputs an executing signal(s) that is encoded by the processor 122 and then treated by the control circuit 140. In contrast, when the first switch 143A is opened, the intermediary device 120 outputs an executing signal(s) that is generated by a stick of the intermediary device 120. Accordingly, by switching the first switch to be closed or opened, the control of the unmanned aerial vehicle 130 via the mobile device 110 or a stick of the intermediary device 120 can be determined. This design has advantage of without needing to restart the unmanned aerial vehicle 130. In another embodiment of this invention, the mobile device 110 may include a real or virtual switch allowing the operator to change the first switch 143A and the second switch 143B to be opened or closed.

The difference between FIG. 3A and FIG. 3B is described as follows. The control circuit 140 of FIG. 3A does not include the first switch 143A, the second switch 143B, and the control resistor 144, so that the operator can merely control the unmanned aerial vehicle 130 via the mobile device 110. In contrast, the control circuit 140 of FIG. 3B includes the first switch 143A and the second switch 143B, so that the operator can select to control the unmanned aerial vehicle 130 via the interface 113 of the mobile device 110 or the stick of the intermediary device 120. In addition, the control circuit 140 of FIG. 3A denotes a path of the stick. Generally the stick can be turned right, left, up, and down, which denotes two paths to be controlled, and two sticks will need four paths. And four paths need four control circuits 140 as shown in FIG. 3A.

Figure 3D:
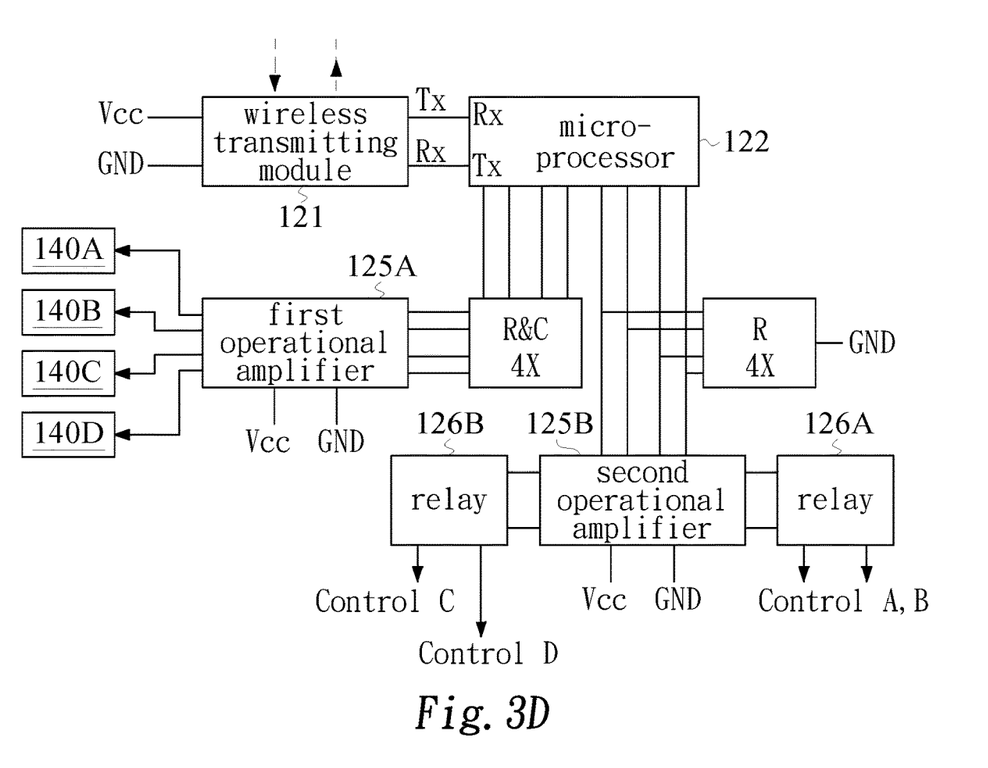
FIG. 3D is a circuit diagram showing an intermediary device in accordance with an embodiment of this invention.

FIG. 3D is a circuit diagram showing an intermediary device 120 in accordance with another embodiment of this invention. Referring to FIG. 3D, the intermediary device 120 includes a wireless transmitting module 121, a micro processor 122, a first operational amplifier 125A, a second operational amplifier 125B, a relay 126A, a relay 126B, and control circuits 140A, 140B, 140C, and 140D. After the wireless transmitting module 121 receives the control order from the mobile device 110, the control order is turned to a programmed language and executed by the microprocessor 122. The programmed language makes the unmanned aerial vehicle 130 to do a series of actions. When the operator selects using the mobile device 110 to control the unmanned aerial vehicle 130, a control order may be provided to the intermediary device 120 and the microprocessor 122 encodes the control signal and the encoded signal is transmitted to the control circuits 140A-D via the first operational amplifier 125A. If the encoded signal from the microprocessor is strong, there may be need not to amplify by the first operational amplifier 125A. The encoded signal is then transmitted to the unmanned aerial vehicle 130 via the wireless transmitting module 121. The control via the intermediary device 120 has advantage of easy control.

On the other hand, if the operator selects to control the unmanned aerial vehicle 130 by a stick interface (including one or more sticks) of the intermediary device 120, the microprocessor encodes the control order and generates an executing signal (Control A-D) via the second operational amplifier 125B and relays 126A/126B.

In addition, if no control order has been received, the microprocessor 122 of the intermediary device 120 may generate a hover signal transmitting to the unmanned aerial vehicle 130 to control it hovering in the air.

Figure 4A:
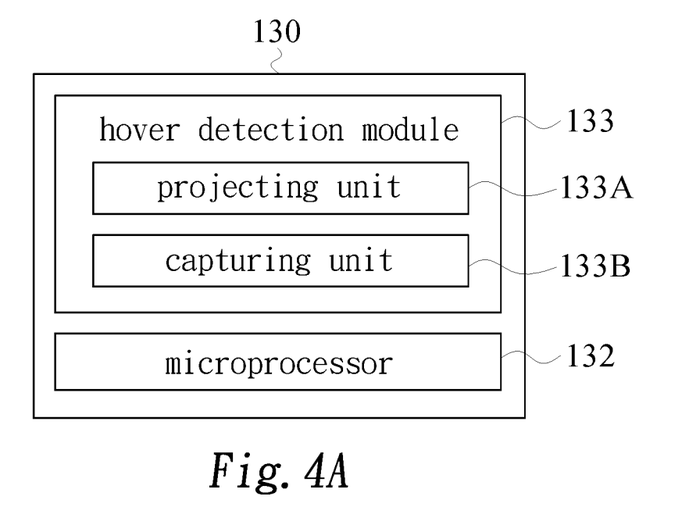
FIGS. 4A and 4B are block diagrams showing an unmanned aerial vehicle in accordance with a preferred embodiment of this invention.

FIG. 4A is a block diagram showing an unmanned aerial vehicle in accordance with an embodiment of this invention. Referring to FIG. 4A, the unmanned aerial vehicle 130 may further include a hover detection module 133 and a microprocessor 132. The hover detection module 133 includes a projection unit 133A and a capturing unit 133B. The projection unit 133A is used to project two collimated (parallel) light beams and a specific pattern (e.g., a square pattern) on the ground from the unmanned aerial vehicle 130. The capturing unit 133B is used to capture an image of the two light beams and the specific pattern projected on the ground and the captured image is transmitted to the microprocessor 132. The microprocessor 132 analyzes the captured image to judge whether the unmanned aerial vehicle 130 is hovering or not.

Accordingly, if the captured image shows that the appearance of the pattern has no deformation, the unmanned aerial vehicle 130 is flying horizontally. At this situation, the two collimated (parallel) light beams are perpendicular to the ground, and the distance between the two collimated (parallel) light beams is a constant no matter the unmanned aerial vehicle 130 is far or close to the ground. However, the sizes of the two collimated (parallel) light beams shown in the captured image depend on the distance between the unmanned aerial vehicle 130 and the ground. The sizes of the two beams become large when the unmanned aerial vehicle 130 is near to the ground, and the sizes turn to small when the unmanned aerial vehicle 130 is far from to the ground. The altitude of the unmanned aerial vehicle 130 is therefore can be calculated and controlled by the microprocessor 132.

In another embodiment of this invention, the projection unit 133A is able to project a light beam with a specific wavelength, e.g., a laser emitted by a laser diode or a light emitted from a light-emitting diode with a narrow wavelength bandwidth. And similarly, the projection unit 133A is used to project two collimated (parallel) light beams and a specific pattern (e.g., a square pattern) on the ground from the unmanned aerial vehicle 130. The capturing unit 133B is used to capture an image of the two light beams and the specific pattern projected on the ground and the captured image is transmitted to the microprocessor 132. In addition, the capturing unit 133B further includes a filter for passing light with the specific wavelength emitted from the projector unit 133A. Accordingly, the light from the environment can be filtered, and only two light beams and the pattern are captured by the capturing unit 133B. This design can simplify the procedure to treat the captured image, and hence a lower end of microprocessor can be used for saving the cost.

Figure 4B:
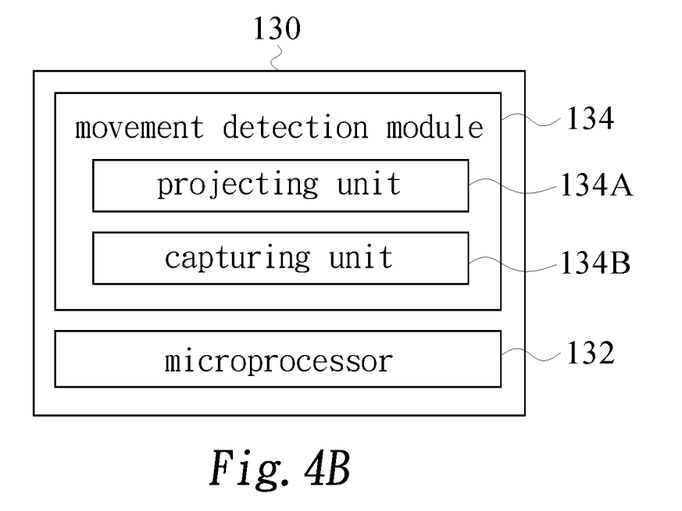

FIG. 4B is a block diagram showing an unmanned aerial vehicle 130 in accordance with another embodiment of this invention. Referring to FIG. 4B, the unmanned aerial vehicle 130 may further include a movement detection module 134, which includes a projection unit 134A and a capturing unit 134B for periodically capturing images of a specific pattern projected by the projection unit. The captured images are transmitted to the microprocessor 132 for analysis and comparison to obtain moving direction of the unmanned aerial vehicle 130. In detail, because the ground is not smooth, the specific pattern will be different between the captured images due to the different topographies, and the difference between the captured images can be used to control the unmanned aerial vehicle 130 hovering around a range within its current horizontal position. In addition, the detail of the projection unit 134A and the capturing unit 134B is the same as the projection unit 133A and the capturing unit 133B, and the description of which is omitted for simplicity.

In addition, the specific pattern projected by the projection unit 134A may be the same as or different from the pattern projected by the projection unit 133A. Other specific patterns may be used according to the need. The capturing unit 134B may also include a filter for passing light with the same wavelength or bandwidth as the light emitted by the projection unit 134A and other lights from the environment are filtered. Hence a lower end of microprocessor 132 can be used for saving the cost.

In an embodiment of this invention, the capturing unit 133B or the capturing unit 134B can take a selfie image of the operator. In detail, a camera of the capturing unit 133B or the capturing unit 134B is backward toward the operator as the unmanned aerial vehicle 130 is advanced. The angle of the camera can be adjusted according to the altitude and the angle of the unmanned aerial vehicle 130. In an embodiment of this invention, the lower part of the images captured by the capturing unit 133B or the capturing unit 134B must include the ground. In addition, the camera of the capturing unit 133B or the capturing unit 134B can automatically turns right or left, and the horizontal coordinate of the intermediary device 120 is at the middle of the captured images. In an embodiment of this invention, the capturing unit 133B and/or the capturing unit 134B includes two cameras, wherein one camera is used to take a selfie image of the operator and the other is used to capture projected filtered images. In particular, the camera used for capturing the projected filtered image needs not a high resolution, and therefore a camera with a lower performance specification can be used for saving the cost.

Figure 5A:
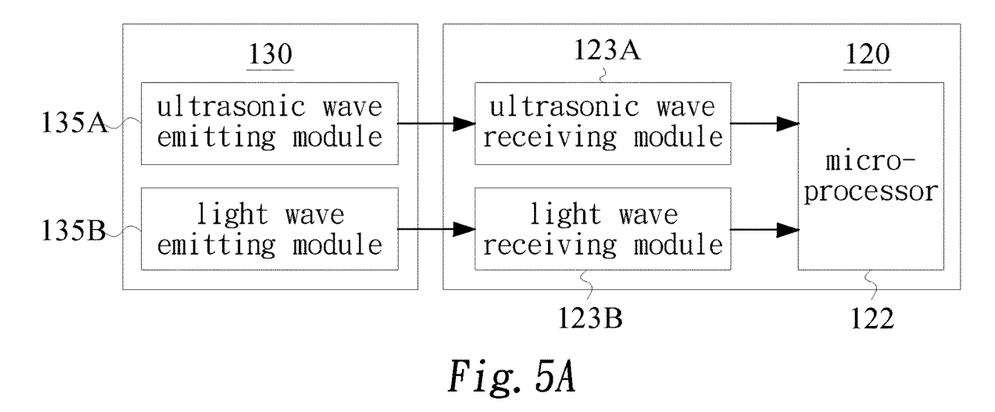
FIGS. 5A and 5B are block diagrams showing an unmanned aerial vehicle with an intermediary device in accordance with a preferred embodiment of this invention.

FIG. 5A is a block diagram showing an unmanned aerial vehicle 130 with an intermediary device 120 in accordance with an embodiment of this invention. Referring to FIG. 5A, the unmanned aerial vehicle 130 may further include an ultrasonic wave emitting module 135A and a light wave emitting module 135B, and the intermediary device 120 may further include an ultrasonic wave receiving module 123A and a light wave receiving module 123B. The ultrasonic wave emitting module 135A and light wave emitting module 135B are used for emitting ultrasonic pulse wave and light pulse wave, respectively. The ultrasonic wave receiving module 123A and the light wave receiving module 123B are used for receiving ultrasonic pulse wave and light pulse wave emitted from the ultrasonic wave emitting module 135A and light wave emitting module 135B, respectively. The light pulse wave is much faster than the ultrasonic pulse wave. The light wave receiving module 123B immediately receives the light pulse wave once the light pulse wave is emitted. The ultrasonic wave receiving module 123A receives the ultrasonic pulse wave later. The time difference between the time of receiving the ultrasonic pulse wave and the time of receiving the light pulse wave can be calculated by the microprocessor 122, and the time difference multiplied by the speed of sound can be used for the distance information between the unmanned aerial vehicle 130 and the intermediary device 120 (or the operator).

According to the embodiment of this invention, the distance between the unmanned aerial vehicle 130 and the operator and the related coordinate information can be obtained by using the ultrasonic wave emitting module 135A, the light wave emitting module 135B, the ultrasonic wave receiving module 123A, and the light wave receiving module 123B, without using satellite Global Positioning System (GPS). In an embodiment of this invention, the light wave emitting module 135B comprises a light-emitting diode for emitting a light pulse wave. Because the distance between the operator and the unmanned aerial vehicle 130 is calculated by the speed of sound instead of speed of light, the period of the ultrasonic pulse wave is unnecessary to be very short. For example, if the period of the ultrasonic pulse wave is 100 μs and the speed of sound is about 350 m/s, the accuracy of the calculated distance can reach 3.5 cm. This accuracy is sufficient for the flight of the unmanned aerial vehicle 130. In addition, because the sound wave and the light emitted by the light-emitting diode may not to be high directional, the distance between the unmanned aerial vehicle 130 and the intermediary device 120 can be calculated over a wide range of the flight of the unmanned aerial vehicle 130.

In an embodiment of this invention, alternatively, the intermediary device 120 includes the pulse wave emitting modules 135A/135B, and the unmanned aerial vehicle 130 includes the pulse wave receiving modules 123A/123B.

Figure 5B:
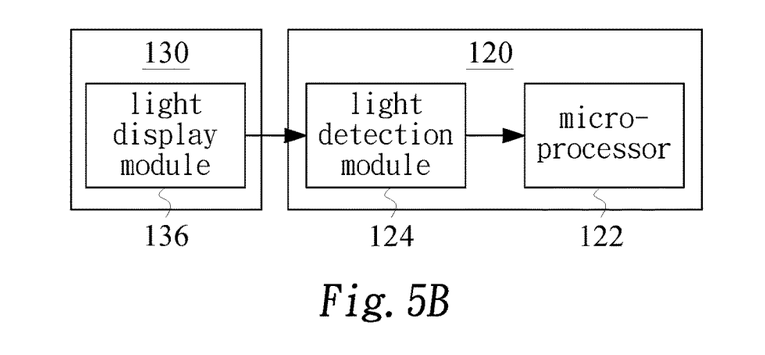

FIG. 5B is a block diagram showing an unmanned aerial vehicle 130 with an intermediary device 120 in accordance with an embodiment of this invention. Referring to FIG. 5B, the unmanned aerial vehicle 130 may further include a light emitting module 136, and the intermediary device 120 may further include a light detection module 124. The light emitting module 136 includes several light sources that can emit at least three light signals with at least two different colors, and the light detection module 124 is used to capture images of the light emitting module 136. The captured images are transmitted to the microprocessor 122 of the intermediary device 120. The microprocessor 122 analyzes the captured images to obtain the orientation and angle of the unmanned aerial vehicle 130, and the analyzed information can be used as a basis for a new control order of the mobile device 110 or the intermediary device 120.

In this embodiment of this invention, the light detection module 124 is arranged at the intermediary device 120; however, it can be arranged at the mobile device 110 in another embodiment of this invention. In addition, the light detection module 124 can further include a filter for passing the light(s) with same wavelength or bandwidth as the light(s) emitted from the light emitting module 136. The analysis of the captured image is therefore can be simplified.

In addition, after the unmanned aerial vehicle 130 flies on the air, the orientation of the unmanned aerial vehicle 130 is needed to be aware by the operator. A general method is to calculate the orientation of the aerial vehicle 130 by the magnetic field of the earth, e.g., using a compass. This method needs to be calibrated at the position on which the unmanned aerial vehicle 130 flies. However, the magnetic field of the earth may be interfered by the environment, resulting in inaccurate orientation. By contrast, the present invention provides a method to obtain the orientation of the unmanned aerial vehicle 130 without using the magnetic field. The following describes the method of this invention.

According to the embodiment of this invention, the light emitting module 136 includes at least three light sources that can emit lights with at least two different colors. And a capturing unit of the light detection module 124 of the mobile device 110 or the intermediary device 120 is used for capturing images of the light sources of the light emitting module 136. In a particular embodiment, the light emitting module 136 includes four light sources respectively arranged at left front corner, right front corner, left rear corner, and right rear corner of a squared unmanned aerial vehicle 130, and the four light sources can respectively emit blue, green, red, and orange light. The captured images, combined with the previously obtained information including the distance between the unmanned aerial vehicle 130 and the intermediary device 120 and the altitude of the unmanned aerial vehicle 130, are used to obtain the orientation of the unmanned aerial vehicle 130. The orientation of the unmanned aerial vehicle 130 is then transmitted to the mobile device 110 or the intermediary device 120 for a basis of a new control order. By the distance between the unmanned aerial vehicle 130 and the intermediary device 120 and the image of the light emitting module 136, the coordinates of the unmanned aerial vehicle 130 in related to the mobile device 110 or the intermediary device 120 can be obtained. And the orientation of the unmanned aerial vehicle 130 can be calculated by the related positions of the light emitting module 136.

In another embodiment of this invention, the unmanned aerial vehicle 130 includes a plurality of capturing units arranged at the front and rear of the unmanned aerial vehicle 130, respectively. Alternatively, the capturing units are spaced at the periphery of the unmanned aerial vehicle 130. In addition, the intermediate device 120 includes a light emitting module, which can include one or more light-emitting diodes. The images of the intermediary device 120 are captured by the capturing units during the flight of the unmanned aerial vehicle 130. The captured images are transmitted to the microprocessor 122 of the intermediary device 120 to be analyzed, so as to obtain an angle of the intermediary device 120 in relative to the unmanned aerial vehicle 130. In addition, the distance between the unmanned aerial vehicle 130 and the intermediary device 120 and the altitude of the unmanned aerial vehicle 130 have been previously obtained. Combined with this information, a position of the unmanned aerial vehicle 130 in relative to the intermediary device 120 can be obtained and the orientation of the unmanned aerial vehicle 130 can be calculated.

In the above-mentioned two embodiments, the light emitting module includes one or more light-emitting diodes that can emit a light with specific wavelength or bandwidth, and the capturing unit can further include a filter for passing light with a wavelength or bandwidth same as the light emitting from the light emitting module and filtering other lights from the environment. The image analysis is therefore can be simplified. The light-emitting diode(s) and the filter are easily obtained with a low price. The cost of the unmanned aerial vehicle 130 and the intermediary device with the efficient orientated functions can be reduced.

The unmanned aerial vehicle 130 with the intermediary device 120 provided by this invention are very easy to be controlled. A game application software may be installed in the mobile device 110 to be played with the unmanned aerial vehicle 130. For example, a treasure hunting game application software is installed in the mobile device 110, and the operator can search treasures via the real unmanned aerial vehicle 130. The operator can communicate with other players and real images can be captured by the unmanned aerial vehicle 130 during the treasure hunting.

The intent accompanying this disclosure is to have each/all embodiments construed in conjunction with the knowledge of one skilled in the art to cover all modifications, variations, combinations, permutations, omissions, substitutions, alternatives, and equivalents of the embodiments, to the extent not mutually exclusive, as may fall within the spirit and scope of the invention. Corresponding or related structure and methods disclosed or referenced herein, and/or in any and all co-pending, abandoned or patented application(s) by any of the named inventor(s) or assignee(s) of this application and invention, are incorporated herein by reference in their entireties, wherein such incorporation includes corresponding or related structure (and modifications thereof) which may be, in whole or in part, (i) operable and/or constructed with, (ii) modified by one skilled in the art to be operable and/or constructed with, and/or (iii) implemented/made/used with or in combination with, any part(s) of the present invention according to this disclosure, that of the application and references cited therein, and the knowledge and judgment of one skilled in the art.

Conditional language, such as, among others, "can," "could," "might," or "may," unless specifically stated otherwise, or otherwise understood within the context as used, is generally intended to convey that embodiments include, and in other interpretations do not include, certain features, elements and/or steps. Thus, such conditional language is not generally intended to imply that features, elements and/or steps are in any way required for one or more embodiments, or interpretations thereof, or that one or more embodiments necessarily include logic for deciding, with or without user input or prompting, whether these features, elements and/or steps are included or are to be performed in any particular embodiment.

All of the contents of the preceding documents are incorporated herein by reference in their entireties. Although the disclosure herein refers to certain illustrated embodiments, it is to be understood that these embodiments have been presented by way of example rather than limitation. For example, any of the particulars or features set out or referenced herein, or other features, including method steps and techniques, may be used with any other structure(s) and process described or referenced herein, in whole or in part, in any combination or permutation as a non-equivalent, separate, non-interchangeable aspect of this invention. Corresponding or related structure and methods specifically contemplated and disclosed herein as part of this invention, to the extent not mutually inconsistent as will be apparent from the context, this specification, and the knowledge of one skilled in the art, including, modifications thereto, which may be, in whole or in part, (i) operable and/or constructed with, (ii) modified by one skilled in the art to be operable and/or constructed with, and/or (iii) implemented/made/used with or in combination with, any parts of the present invention according to this disclosure, include: (I) any one or more parts of the above disclosed or referenced structure and methods and/or (II) subject matter of any one or more of the inventive concepts set forth herein and parts thereof, in any permutation and/or combination, include the subject matter of any one or more of the mentioned features and aspects, in any permutation and/or combination.

Although specific embodiments have been illustrated and described, it will be appreciated by those skilled in the art that various modifications may be made without departing from the scope of the present invention, which is intended to be limited solely by the appended claims.

What is claimed is:

1. A control system used for unmanned aerial vehicles, comprising:
   an unmanned aerial vehicle;
   a mobile device installed with an application software allowing an operator to input a control order; and
   an intermediary device comprising a microprocessor for receiving the control order and encoding an executing signal according to the control order, the executing signal being transmitted to the unmanned aerial vehicle to control the unmanned aerial vehicle;
   wherein the intermediary device automatically generates a hover signal to the unmanned aerial vehicle to make the unmanned aerial vehicle hovering until a new control order is received;
   wherein a motion of the operator is detected by sensing elements of the mobile device for generating the control order, the sensing elements comprising an orientation sensor, an accelerometer, a movement sensor, or a gyroscope.

2. The control system as recited in claim 1, wherein the mobile device is a smart phone, a tablet, or a wearable device carried by the operator.

3. The control system as recited in claim 2, wherein the interface includes a flight radar chart consisting of concentric circles or arcs to identify the relative position of the unmanned aerial vehicle, and the gap between concentric circles denotes a real distance.

4. The control system as recited in claim 3, wherein the concentric circles of the flight radar chart utilize different styles or colors to indicate the altitude of the unmanned aerial vehicle.

5. The control system as recited in claim 3, wherein a scene photographed by a camera of the unmanned aerial vehicle and the flight radar chart are simultaneously displayed on the interface in real time and a map is further displayed on the interface if the distance between the unmanned aerial vehicle and the operator is far, and the operator taps a position of the scene displayed on the interface for ordering the unmanned aerial vehicle to fly to the position of the scene.

6. The control system as recited in claim 2, wherein the interface comprises a button and a specific control order is generated after the button is tapped.

7. The control system as recited in claim 1, wherein the application software comprises:
   an interface allowing the operator to tap once corresponding to one control order, the unmanned aerial vehicle flying to a specific position or performing a specific action according to the control order.

8. The control system as recited in claim 1, wherein the control order is a single order to instruct the unmanned aerial vehicle.

9. The control system as recited in claim 1, wherein the control order is generated only when the time difference between the two successive sensing signals due to the operator's motion detected by the sensing elements is at least 0.1 second.

10. The control system as recited in claim 1, wherein the detection of the sensing elements comprises a time threshold, a distance threshold, or an angle threshold is predetermined, and the control order is generated accordingly.

11. The control system as recited in claim 1, wherein the mobile device includes a microphone for receiving a voice of the operator, and the control order is generated according to the voice.

12. The control system as recited in claim 1, wherein the intermediary device is a mobile device or a wearable device.

13. The control system as recited in claim 1, wherein a wireless communication is used both between the intermediary device and the mobile device and between the intermediary device and the unmanned aerial vehicle.

14. The control system as recited in claim 1, wherein a wire communication is used between the intermediary device and the mobile device and a wireless communication is used between the intermediary device and the unmanned aerial vehicle.

15. A control system used for unmanned aerial vehicles, comprising:
   an unmanned aerial vehicle; and
   an intermediary device, comprising:
      at least a microprocessor for receiving a control order from an operator and encoding an executing signal according to the control order, the executing signal being transmitted to the unmanned aerial vehicle to control the unmanned aerial vehicle; and
      at least a control circuit providing a hover signal to make the unmanned aerial vehicle hovering in the air;
   wherein the control circuit comprises:
      an input terminal to receive the executing signal encoded by the microprocessor;
      an output terminal;
      a P-type Metal-Oxide-Semiconductor Field-Effect Transistor (PMOS), wherein the gate of the PMOS electrically connects with the input terminal, and the source of the PMOS electrically connects with a power source;
      an N-type Metal-Oxide-Semiconductor Field-Effect Transistor (NMOS), wherein the gate of the NMOS electrically connects with the input terminal, the drain of the NMOS electrically connects with the drain of the PMOS and the output terminal, and the source of the NMOS 142 is grounded; and
      a control resistor, wherein the first terminal of the control resistor electrically connects with the power source and the source of the PMOS, the second terminal of the control resistor is grounded, and the third terminal of the control resistor electrically connects with the output terminal.

16. The control system as recited in claim 15, wherein the control resistor is a variable resistor or two resistors connected in series.

17. The control system as recited in claim 15, wherein the control circuit further comprises:
   a first switch having two terminals with one electrically connecting with the output terminal and the other electrically connecting with the drain of the PMOS and the drain of the NMOS.

18. The control system as recited in claim 17, wherein when the first switch is closed, the intermediary device outputs an executing signal(s) that is encoded by the processor and then treated by the control circuit.

19. The control system as recited in claim 17, wherein when the first switch is opened, the intermediary device outputs an executing signal(s) that is generated by a stick interface of the intermediary device.

20. The control system as recited in claim 15, wherein the control circuit further comprises:
   a second switch having two terminals electrically connected with the source of the PMOS and the power source, respectively.

21. The control system as recited in claim 15, further comprising a wireless transmitting module for receiving the control order from a mobile device.

22. A control system used for unmanned aerial vehicles, comprising:
- an intermediary device;
- a mobile device; and
- an unmanned aerial vehicle for receiving an executing signal from the intermediary device and performing actions according to the executing signal, wherein the intermediary device receives a control order inputted by an operator from the mobile device and encoding the executing signal according to the control order, and the intermediary device automatically generates a hover signal to the unmanned aerial vehicle to make the unmanned aerial vehicle hovering in the air until a new control order is received;
- wherein the unmanned aerial vehicle further comprises:
  - a hover detection module, comprising:
    - a projection unit for projecting two collimated light beams and a specific pattern on the ground;
    - a capturing unit for capturing an image of the two collimated light beams and the specific pattern projected on the ground; and
    - a microprocessor for analyzing the captured image to judge whether the unmanned aerial vehicle is hovering or not and whether the unmanned aerial vehicle is flying horizontally.

23. The control system as recited in claim 22, wherein the two collimated light beams and the specific pattern are emitted with a specific wavelength or bandwidth.

24. The control system as recited in claim 23, wherein the capturing unit further comprises a filter for passing light with a wavelength or bandwidth same as the specific wavelength or bandwidth and filtering out other light from the environment.

25. The control system as recited in claim 22, wherein the projected pattern and distance between the light spots corresponding to the two collimated light beams shown in the captured image are used to calculate a distance between the unmanned aerial vehicle and the ground and for maintaining the unmanned aerial vehicle at a fixed altitude.

26. The control system as recited in claim 22, wherein the unmanned aerial vehicle further comprises:
- a movement detection module, comprising:
  - a projection unit for projecting a specific pattern to the ground; and
  - a capturing unit for periodically capturing images of a specific pattern projected by the projection unit; and
  - a microprocessor for analysis and comparison of the captured images to obtain the moving direction of the unmanned aerial vehicle.

27. The control system as recited in claim 26, wherein the specific pattern is emitted with a specific wavelength or bandwidth.

28. The control system as recited in claim 26, wherein the capturing unit further comprises a filter for passing light with a wavelength or bandwidth same as the specific wavelength or bandwidth and filtering out other light from the environment.

29. The control system as recited in claim 26, wherein the capturing unit can take a selfie image of the operator, and an angle of a camera of the capturing unit can be adjusted.

30. The control system as recited in claim 22, further comprising:
- an ultrasonic wave emitting module and a light wave emitting module either disposed at the unmanned aerial vehicle or the intermediary device for emitting ultrasonic pulse wave and light pulse wave, respectively; and
- an ultrasonic wave receiving module and a light wave receiving module either disposed at the intermediary device or the unmanned aerial vehicle for receiving the ultrasonic pulse wave and the light pulse wave, respectively;
- wherein the received ultrasonic pulse wave and the light pulse wave are transmitted to a microprocessor of the intermediary device or the unmanned aerial vehicle, and a distance between the unmanned aerial vehicle and the intermediary device is calculated according a time difference between the time of receiving the ultrasonic pulse wave and the time of receiving the light pulse wave.

31. The control system as recited in claim 22, wherein the unmanned aerial vehicle further comprises:
- a light emitting module includes at least three light sources that can emit at least three light beams with at least two different colors;
- wherein the intermediary device comprises a light detection module to capture images of the light emitting module, and the captured images are transmitted to a microprocessor of the intermediary device or the unmanned aerial vehicle to be analyzed for obtaining the orientation and angle of the unmanned aerial vehicle.

32. The control system as recited in claim 22, wherein the unmanned aerial vehicle further comprises:
- a plurality of capturing units are arranged at the front and rear or the periphery of the unmanned aerial vehicle;
- wherein the intermediary device comprises a light emitting module, and the capturing units are used to capture images of the light emitting module, and the captured images are transmitted to a microprocessor of the intermediary device or the unmanned aerial vehicle to be analyzed for obtaining an angle of the intermediary device in relative to the unmanned aerial vehicle.

33. The control system as recited in claim 32, wherein a coordinate of unmanned aerial vehicle in relative to the mobile device or the intermediary device is obtained by a distance between the unmanned aerial vehicle and the intermediary device and the captured images of the light emitting module.

34. The control system as recited in claim 33, wherein the distance between the unmanned aerial vehicle and the intermediary device is calculated as follows: the intermediary device comprising an ultrasonic wave receiving module and a light wave receiving module for receiving a ultrasonic pulse wave and a light pulse wave emitted from the unmanned aerial vehicle, respectively, a distance between the unmanned aerial vehicle and the intermediary device being calculated according to a time difference between the time of receiving the ultrasonic pulse wave and the time of receiving the light pulse wave.

* * * * *